United States Patent [19]
Abusleme et al.

[11] Patent Number: 5,434,229
[45] Date of Patent: Jul. 18, 1995

[54] RADICAL (CO)POLYMERIZATION PROCESS OF FLUORINATED OLEFINIC MONOMERS

[75] Inventors: Julio A. Abusleme, Saronno; Guglielmo Gregorio, Milan, both of Italy

[73] Assignee: Ausimont S.p.A., Italy

[21] Appl. No.: 200,224

[22] Filed: Feb. 23, 1994

[30] Foreign Application Priority Data

Feb. 23, 1993 [IT] Italy ................ MI93A0339

[51] Int. Cl.⁶ .................... C08F 2/18; C08F 2/22
[52] U.S. Cl. ........................... 526/207; 526/249
[58] Field of Search ..................... 526/207, 249

[56] References Cited

U.S. PATENT DOCUMENTS

| | | |
|---|---|---|
| 2,515,628 | 7/1950 | Castle . |
| 2,520,338 | 8/1950 | Robertson . |
| 2,612,484 | 9/1951 | Bankoff ................ 526/207 |
| 2,753,329 | 7/1956 | Kroll et al. ............ 526/207 |
| 2,991,278 | 7/1961 | Schildknecht ......... 526/207 |
| 3,053,820 | 9/1962 | Wechsler et al. ...... 526/207 |
| 3,066,122 | 11/1962 | Brinker et al. ........ 526/207 |
| 3,467,635 | 9/1969 | Brasen et al. . |
| 3,624,250 | 11/1971 | Carbon . |
| 3,865,845 | 2/1975 | Resnick . |
| 3,978,030 | 8/1976 | Resnick . |
| 4,146,532 | 3/1979 | Kometani et al. ..... 526/207 |
| 4,186,121 | 1/1980 | Gangal ................... 526/207 |
| 4,243,770 | 1/1981 | Tatemoto et al. . |
| 4,426,501 | 1/1984 | Khan . |
| 4,513,129 | 4/1985 | Nakagawa et al. . |
| 4,675,380 | 6/1987 | Buckmaster et al. . |
| 4,694,045 | 9/1987 | Moore . |
| 4,753,994 | 6/1988 | Carter, Jr. et al. . |
| 4,789,717 | 12/1988 | Giannetti et al. . |
| 4,864,006 | 9/1989 | Giannetti et al. . |
| 4,973,633 | 11/1990 | Moore . |
| 5,087,679 | 2/1992 | Inukai et al. . |

FOREIGN PATENT DOCUMENTS

| | | |
|---|---|---|
| 0073087 | 3/1983 | European Pat. Off. . |
| 0075312 | 3/1983 | European Pat. Off. . |
| 0076581 | 4/1983 | European Pat. Off. . |
| 0080187 | 6/1983 | European Pat. Off. . |
| 0271243 | 6/1988 | European Pat. Off. . |
| 0407937 | 1/1991 | European Pat. Off. . |
| 0518073 | 12/1992 | European Pat. Off. . |
| 4618139 | 5/1971 | Japan ................ 526/207 |
| 0025412 | 2/1980 | Japan ................ 526/207 |
| 888765 | 2/1962 | United Kingdom . |
| 941106 | 11/1963 | United Kingdom ... 526/207 |

OTHER PUBLICATIONS

Chemistry of Organic Compounds by Noller, Oct. 1956, pp. 58, 59.
Chemical Abstracts, vol. 88, No. 22, 29 May 1978, Columbus, Ohio US; abstract No. 153246b.
Database Chemical Abstracts, 73 661u, Colombus, Ohio, US.
Kirk–Othmer, Encyclopedia of Chem. Tech., vol. 9, pp. 500–515, 1979.

*Primary Examiner*—Joseph L. Schofer
*Assistant Examiner*—N. Sarofim
*Attorney, Agent, or Firm*—Bryan Cave

[57] ABSTRACT

Branched aliphatic hydrocarbons, having from 6 to 25 carbon atoms and a ratio between the number of methyl groups and the number of carbon atoms higher than 0.5, are used in radical (co)polymerization processes of fluorinated olefinic monomers, optionally in association with non-fluorinated olefins, both in suspension and in aqueous emulsion. Such hydrocarbons are characterized, in the usual reaction conditions, by a chain transfer effect practically absent.

6 Claims, No Drawings

RADICAL (CO)POLYMERIZATION PROCESS OF FLUORINATED OLEFINIC MONOMERS

The present invention relates to a radical (co)polymerization process of fluorinated olefinic monomers, in which a branched aliphatic hydrocarbon is used.

As well known in the art, the (co)polymerization reactions of fluorinated olefinic monomers are carried out via radicals in the presence of suitable initiators, such as inorganic peroxides (for instance, ammonium or potassium persulphate) or organic peroxides (for instance, disuccinylperoxide or other products insoluble in water described in EP-75,312, or also azo-compounds (see U.S. Pat. No. 2,515,628 and U.S. Pat. No. 2,520,338). If operating at low polymerization temperatures is desired (for instance, between 10° and 50° C.), redox initiators are employable.

Among the various (co)polymerization techniques, that in suspension, where the monomers are dispersed in water or in a suitable organic solvent, is largely employed. As solvents, chlorofluorocarbons, such as trichlorotrifluoroethane, dichlorotetrafluoroethane, etc. (see, for example, U.S. Pat. No. 4,513,129 and EP-271,243), are employed. When operating in organic solvent, water can be added to the reaction system, in order to promote the loss of heat during the reaction.

Viceversa, also when operating in water, an organic solvent can be present too, utilized in this case as carrier for peroxides, when the solubility or explosivity characteristics of the latter prevent their introduction into the reactor in the pure state.

Another (co)polymerization technique of fluorinated olefinic monomers is that in aqueous emulsion, in which it is operated in the presence of a suitable surfactant. For instance, in U.S. Pat. No. 4,426,501, it is described a copolymerization process in aqueous emulsion of ethylene, propylene or isobutylene with tetrafluoroethylene or chlorotrifluoroethylene, in which to the aqueous medium a couple of solvents is added, one being hydrophilic, the other hydrophobic, able to modify the solubility characteristics in water of the different comonomers. In particular, according to such a technique, the copolymerization of tetrafluoroethylene/ethylene is carried out in aqueous emulsion in the presence of terbutylic alcohol as hydrophilic solvent and of 1,1,2-trichloro-1,2,1-trifluoroethane (CFC 113) as hydrophobic solvent.

A remarkable improvement in the emulsion (co)polymerization technique of fluorinated monomers has been obtained with the employment of emulsions or microemulsions of perfluoropolyoxyalkylenes, according to what described in U.S. Pat. Nos. 4,789,717 and 4,864,006.

Both for the technique in aqueous emulsion and for that in suspension, the selection of the organic solvent, whatever its function, is crucial for obtaining a satisfactory result. In fact, it is essential to utilize solvents not taking part in the polymerization reaction, and in particular not acting as chain transfer agents. Should this occur, one would have an unwished and uncontrollable decrease of the molecular weight of the final polymer, with subsequent worsening of the mechanical properties of the polymer itself. Possible adjustments of the molecolar weight must instead be carried out by controlled addition in the reaction medium of a suitable chain transfer agent.

As previously described, for (co)polymerization reactions of fluorinated monomers solvents of chlorofluorocarbon type are usually employed, which in a few years will have to be fully replaced with products harmless for the ozone layer of the atmosphere. It is therefore strongly felt the need of finding a new class of solvents meeting the above described requirements and not causing environment pollution problems, besides being characterized by a ratio cost/availability as low as possible.

The Applicant has now found that a particular class of branched aliphatic hydrocarbons meets the above said requirements. In particular, such hydrocarbons are characterized, in the usual (co)polymerization conditions of fluorinated olefinic monomers, by a practically absent chain transfer effect, and therefore they can be employed as solvents in radical (co)polymerization reactions of such monomers, both in suspension and in aqueous emulsion.

It is therefore object of the present invention a radical (co)polymerization process of one or more fluorinated olefinic monomers, optionally in association with one or more non-fluorinated olefins, in which said monomers are (co)polymerized in suspension or in aqueous emulsion in the presence of a branched aliphatic hydrocarbon, or mixtures thereof, having from 6 to 25, preferably from 6 to 14, carbon atoms and characterized by a ratio between the number of methyl groups and the number of carbon atoms higher than 0.5.

Examples of branched aliphatic hydrocarbons which can be employed in the process object of the present invention are: 2,3-dimethylbutane, 2,3-dimethylpentane, 2,2,4-trimethylpentane, 2,2,4,6,6-pentamethylheptane, 2,2,4,4,4,6-pentamethylheptane, etc.

They are in general commercial products obtainable with conventional synthesis methods, employed on a large scale in petrochemical industry. Mixtures obtainable by dimerization or co-dimerization, or oligomerization, and subsequent hydrogenation of propylene and/or isobutylene, or also directly by alkylation, catalyzed by acids, of the same olefins with isobutane, are of particular practical interest. For instance, 2,2,4-trimethylpentane is obtainable by hydrogenation of the dimers of isobutylene, while the hydrogenation of the trimers of isobutylene leads to obtain a mixture consisting of about 90% of 2,2,4,6,6-pentamethylheptane and of about 10% of 2,2,4,4,6-pentamethylheptane.

The process object of the present invention can be employed with all kinds of fluorinated olefinic monomers, optionally containing hydrogen and/or chlorine and/or bromine and/or oxygen, provided that they are able to give rise to (co)polymers by radical reaction in suspension and/or in aqueous emulsion. Among them we cite: $C_2$-$C_8$ perfluoroolefins, such as tetrafluoroethylene (TFE), hexafluoropropene (HFP), hexafluoroisobutene; $C_2$-$C_8$ hydrogenated fluoroolefins, such as vinylfluoride (VF), vinylidene fluoride (VDF) and trifluoroethylene; $C_1$-$C_8$ chloro- and/or bromo- and/or iodo-fluoroolefins, such as chlorotrifluoroethylene (CTFE) and bromotrifluoroethylene; (per)fluorovinylethers $CF_2=CFOX$, where X is a $C_1$-$C_6$ perfluoroalkyl, for instance trifluoromethyl, bromodifluoromethyl or pentafluoropropyl, or a $C_1$-$C_9$ perfluorooxyalkyl having one or more ethereal groups, for instance perfluoro-2-propoxy-propyl; perfluorodioxols.

The fluorinated olefinic monomers can be also copolymerized with $C_2$-$C_8$ unfluorinated olefins, such as ethylene, propylene, isobutylene.

Among the polymers to which the process object of the present invention applies, there are in particular comprised:

(a) "modified" polytetrafluoroethylene, containing small amounts, generally comprised between 0.1 to 3% by mols, preferably lower than 0.5% by mols, of one or more comonomers such as, for example: perfluoropropene, perfluoroalkyl-vinylethers, vinylidene fluoride, hexafluoroisobutene, chlorotrifluoroethylene;

(b) TFE thermoplastic polymers containing from 0.5 to 5% by moles of at least a perfluoroalkylvinylether, where the alkyl has from 1 to 6 carbon atoms, such as, for instance, the TFE/perfluoropropylvinylether and TFE/perfluoromethylvinylether copolymers;

(c) TFE thermoplastic polymers containing from 2 to 20% by mols of a $C_3$–$C_8$ perfluoroolefin, such as, for example, FEP (TFE/HFP copolymer), to which other comonomers having vinylethereal structure can be added in small amounts (lower than 5% by mols) (see for instance U.S. Pat. No. 4,675,380);

(d) TFE or CTFE copolymers with ethylene, propylene or isobutylene, optionally containing a third fluorinated comonomer in amounts comprised between 0.1 to 10% by mols (see for instance U.S. Pat. Nos. 3,624,250 and 4,513,129);

(e) TFE elastomeric copolymers with a perfluoro(oxy)alkylvinylether, optionally containing propylene or ethylene, besides lower amounts of a "cure-site" monomer (see for instance U.S. Pat. Nos. 3,467,635 and 4,694,045);

(f) polymers having dielectric characteristics, comprising 60–79% by mols of VDF, 18–22% by mols of trifluoroethylene and 3–22% by mols of CTFE (see U.S. Pat. No. 5,087,679);

(g) VDF elastomeric polymers, such as VDF/HFP copolymers and VDF/HFP/TFE terpolymers (see, for instance, GB Patent 888,765 and Kirk-Othmer, "Encyclopedia of Chemical Technology", Vol. 8, pag. 500–515—1979); such polymers can also contain: hydrogenated olefins, such as ethylene and propylene (as described for instance in EP 518,073); perfluoroalkylvinylethers; brominated "cure-site" comonomers and/or terminal iodine atoms, according to what described, for instance, in U.S. Pat. No. 4,243,770, U.S. Pat. No. 4,973,633 and EP 407,937;

(h) polyvinylidenfluoride or modified polyvinylidenfluoride containing little amounts, generally comprised between 0.1 and 10% by mols, of one or more fluorinated comonomers, such as hexafluoropropene, tetrafluoroethylene, trifluoroethylene.

The polymers of the above indicated classes, and in particular the TFE based polymers, can be modified by addition as comonomers of perfluorinated dioxols, according to what described for instance in U.S. Pat. No. 3,865,845, U.S. Pat. No. 3,978,030, EP-73,087, EP-76,581, EP-80,187.

Some working examples are reported hereinunder, for merely illustrative and not limitative purposes of the scope of the invention.

EXAMPLE 1

In a glazed Pfaudler autoclave, provided with a stirrer acting at 350 rpm, 5.3 l of demineralized water, 1.34 kg of chlorotrifluoroethylene (CTFE) and 0.105 mols of chloroform as chain transfer agent were fed. The reactor was then brought to 15° C. and pressurized with ethylene till a pressure of 193 psig. The radical initiator was then gradually introduced into the autoclave, consisting of a solution, maintained at −17° C., of trichloroacetylperoxide in 2,2,4-trimethylpentane, having concentration equal to 0.07 g/cc. The pressure was maintained approximately constant for the whole duration of the polymerization by continuous addition of ethylene in the reactor. After 3 hours 950 g of copolymer were obtained, containing, by mols, about 50% of CTFE and 50% of ethylene. By differential scanning calorimetry (DSC) measurements, a second melting temperature of 240.2° C. was determined on the product, and a Melt Flow Index (MFI) equal to 4.6 (according to the ASTM 3275-89 standard).

EXAMPLE 2 (comparative)

Example 1 was repeated at the same conditions and amounts, by employing $CCl_2F$-$CClF_2$ (CFC-113) as solvent for trichloroacetylperoxide. A 50/50 by mols CTFE/ethylene copolymer was obtained with a second melting temperature (by DSC) of 240.8° C. and MFI=4.4.

By comparison with the data obtained in Example 1, one can notice that the use of a branched aliphatic hydrocarbon according to the present invention does not involve a lowering of the molecular weight of the final product, which shows similar properties to the ones obtainable by the process of the prior art, in which a chlorofluorocarbon is employed.

EXAMPLE 3

In a glazed Pfaudler autoclave, provided with stirrer acting at 350 rpm, 5.3 l of demineralized water and 1.36 kg of chlorotrifluoroethylene (CTFE) were fed. The reactor was then brought to 15° C. and pressurized with ethylene till a pressure of 193 psig. In the autoclave it was then gradually introduced the radical initiator, consisting of a solution, maintained at −17° C., of trichloroacetylperoxide in 2,2,4-trimethylpentane, having a concentration equal to 0.023 mg/cc. The working pressure was approximately maintained constant by continous addition of ethylene in the reactor. After 9 hours, 713 g of a copolymer were obtained, having very high viscosity, such as to make a measurement of the Melt Flow Index impossible. This fact shows that no chain transfer effect from the solvent has arisen.

EXAMPLE 4

In a chromium plated AISI 316 steel 5 l Brighole autoclave, provided with stirrer acting at 650 rpm, there were introduced, after air removal, 3 liters of demineralized water, 1 ml of 2,2,4-trimethylpentane, 11 g of perfluoropropylvinylether (PPVE) and a microemulsion consisting of: 30.61% by weight of a perfluoropolyoxyalkylenic acid of formula

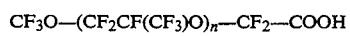

$$CF_3O-(CF_2CF(CF_3)O)_n-CF_2-COOH$$

having acidimetric molecular weight of about 600; 51.02% by weight of an aqueous solution of $NH_4OH$ with volumetric ratio $H_2O$:$NH_4OH$ equal to 4:1; 18.37% by weight of Galden ® DO2. The microemulsion is present in such amounts as to obtain a concentration of surface-active agent equal to 2 g per liter of water. The reactor was brought to 75° C. and maintained at such a temperature for the whole duration of the polymerization. It was then introduced a gaseous mixture consisting of 98% by mols of TFE and of 2% by mols of PPVE, till obtaining an absolute pressure of 20 bar. It was then pumped into the reactor, with a flow rate of 1.5 ml/min, an aqueous solution of potassium persulphate (1.7 g/l). The pressure in the autoclave was maintained constant for the whole duration of the reaction by continuously feeding the mixture TFE/PPVE. After 70 minutes a latex having density 1.12 g/ml was discharged. The polymer, obtained by mechanical coagulation of the latex, showed a very high viscosity, such as to make a measurement of the Melt Flow Index impossible. This fact shows that no chain transfer effect from the solvent has arisen.

EXAMPLE 5 (comparative)

Example 4 was repeated with the same procedure, by employing, instead of 1 ml of 2,2,4-trimethylpentane, 1 ml of a mixture of isomers of dimethylheptane, consisting of 4,6-dimethylheptane, 4,5-dimethylheptane, 4,4-dimethylheptane, 4-ethyl-5-methylhexane. At the end of the reaction, a polymer having MFI =2.0 was obtained. This shows that the hydrocarbon mixture used acts as chain transfer agent.

EXAMPLE 6 (comparative)

In a glazed Pfaudler autoclave, provided with stirrer acting at 350 rpm, there were fed 5.3 l of demineralized water, 1.38 kg of chlorotrifluoroethylene (CTFE) and 0.948 mols of isobutane. The reactor was then brought to 15° C. and pressurized with ethylene till a pressure of 193 psig. In the autoclave it was then gradually introduced the radical initiator, consisting of a solution, maintained at −17° C., of trichloroacetylperoxide in CFC-113 ($CCl_2F$-$CClF_2$), having concentration equal to 0.068 g/cc. The pressure was maintained approximately constant for the whole duration of the polymerization by continuous addition of ethylene in the reactor. After 4 hours, 622 g of copolymer were obtained, containing, by mols, about 50% of CTFE and 50% of ethylene. On the product a second melting temperature (by DSC) of 240.5° C. and MFI=13.2 were determined. These data clearly show that isobutane acts as chain transfer agent.

EXAMPLE 7

In a 500 ml autoclave, provided with a stirrer acting at 900 rpm, 190 ml of demineralized water and 50 ml of methanol were introduced after evacuation. The autoclave was cooled to 0° C. and evacuated again. Then, 65 g of chlorotrifluoroethylene (CTFE) were introduced, and the autoclave was brought to the reaction temperature of 10° C. and pressurized with ethylene to the reaction pressure of 14 absolute bar. 4.8 ml of a solution of trichloroacetylperoxide, kept at −15° C. in isododecane, having a concentration of 0.1 g/ml, were gradually introduced into the autoclave (1.2 ml at the beginning and the other three 1.2 ml portions every hour). The pressure was maintained approximately constant for the whole duration of the polymerization by continuous addition of ethylene in the reactor. After 260 minutes, 33 g of copolymer were obtained, containing, by mols, 47.7% of CTFE and 52.3% of ethylene, and having a second melting temperature (by DSC) of 237.3° C. It showed a very high viscosity, such as to make a measurement of the Melt Flow Index impossible. This fact demonstrates that no chain transfer effect from the solvent has arisen.

We claim:

1. A process for the radical (co)polymerization of one or more fluorinated olefinic monomers, said process comprising (co)polymerizing said monomers in suspension or in aqueous emulsion in the presence of a solvent, said solvent being selected from the group consisting of branched aliphatic hydrocarbons having from 6 to 25 carbon atoms and being characterized by a ratio between the number of methyl groups and the number of carbon atoms higher than 0.5, and mixtures thereof.

2. Process according to claim 1, in which the branched aliphatic hydrocarbon has from 6 to 14 carbon atoms.

3. Process according to claim 2, in which the branched aliphatic hydrocarbon is selected from: 2,3-dimethylbutane, 2,3-dimethylpentane 2,2,4-trimethylpentane, 2,2,4,6,6-pentamethylheptane 2,2,4,4,6-pentamethylheptane or their mixtures.

4. Process according to claim 1, in which the fluorinated olefinic monomers are selected from: $C_2$–$C_8$ perfluoroolefins; $C_2$–$C_8$ hydrogenated fluoroolefins; $C_2$–$C_8$ chloro- and/or bromo- and/or iodo-fluoroolefins; perfluorovinylethers $CF_2$=CFOX, where X is a $C_1$–$C_6$ perfluoroalkyl or a $C_1$–$C_9$ perfluoro-oxyalkyl having one or more ethereal groups; perfluorodioxols.

5. Process according to claim 1, in which the non-fluorinated olefins have from 2 to 8 carbon atoms.

6. The process of claim 1, wherein one or more non-fluorinated olefins is (co)polymerized with said fluorinated olefinic monomers.

* * * * *